W. H. KELLY.
SHOCK ABSORBING SPRING DEVICE.
APPLICATION FILED NOV. 3, 1916.
1,248,671.
Patented Dec. 4, 1917.
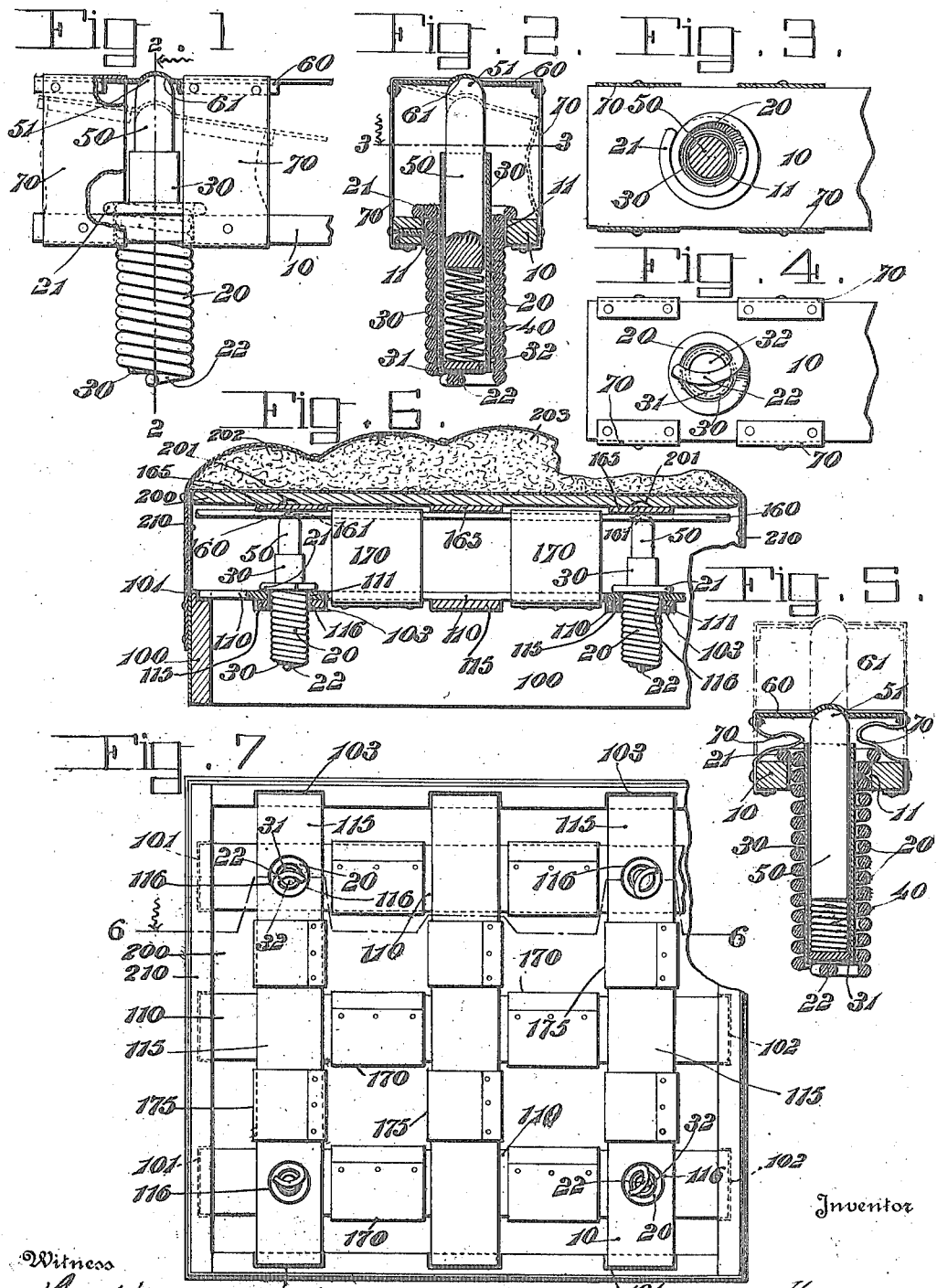

UNITED STATES PATENT OFFICE.

WILLIAM H. KELLY, OF LONG BRANCH, NEW JERSEY.

SHOCK-ABSORBING SPRING DEVICE.

1,248,671.  Specification of Letters Patent.  Patented Dec. 4, 1917.

Application filed November 3, 1916. Serial No. 129,372.

*To all whom it may concern:*

Be it known that I, WILLIAM H. KELLY, a citizen of the United States of America, residing at Long Branch, in the county of Monmouth and State of New Jersey, have invented certain new and useful Improvements in Shock-Absorbing Spring Devices, whereof the following is a specification.

The principal object of the invention is to provide a compact spring device which will readily take up the severe as well as the gentle shocks incident to an automobile seat.

Another object of the invention is to provide a spring device for seats of railway cars and other vehicles, chairs and for other purposes, combining the properties of economy of construction, durability in use, adaptability of application and facility of removal and substitution of parts.

Figure 1 of the accompanying drawings represents a side elevation of an individual spring device embodying this invention, parts being broken out.

Fig. 2 represents a vertical transverse section thereof on line 2—2 of Fig. 1.

Fig. 3 represents a horizontal section thereof on line 3—3 of Fig. 2.

Fig. 4 represents a bottom plan view thereof.

Fig. 5 represents a vertical transverse section thereof showing the device in depressed position, the inner light compression coil spring constituting a part thereof being in compressed position and the heavy outer expansion coil spring constituting another part thereof, being under partial expansion.

Fig. 6 represents a vertical transverse section on line 6—6 of Fig. 7 of a seat for a vehicle or other use embodying a complement of these spring devices.

Fig. 7 represents a bottom plan view of such a seat, parts being broken away.

The same reference numbers indicate corresponding parts in the different figures, round numbers being used for the principal elements and intermediate numbers for subordinate features thereof.

A base 10 of any suitable construction constitutes a part of this spring device and serves as a support for the springs thereof. This base is preferably in the form of a metal plane provided with an aperture 11 disposed centrally or otherwise.

A tubular coil expansion spring 20 is supported at its upper end in the base 10 and depends through the hole 11 thereof. This spring has a lateral projection 21, which is preferably in the form of a flange composed of an enlarged coil integral with the body of the spring. A rest 22 is provided at the lower end of this spring, said rest being preferably composed of a transverse coil or bend of the wire composing the spring.

A tubular plunger 30 is disposed loosely within the tubular expansion spring 20. This tubular plunger has an inner projection 31 at or near its lower end in the form of a flange or otherwise. A disk 32 preferably rests on said flange and closes the lower end of the tubular plunger; but said plunger may be otherwise closed or left open.

A smaller compression coil spring 40 is disposed in said tubular plunger and rests at its lower end on the inward projection or disk therein. This spring is of a more delicate construction and greater elasticity than the expansion spring 20.

A plunger 50 preferably composed of a solid body is slidable in the tubular plunger 30 in contact at its lower end with the upper end of the compression spring 40. The upper end 51 of this plunger is rounded.

A member 60, is disposed some distance above the base 10 and rests on and is supported by the plunger 50. This yielding member is preferably in the form of a plane or plate composed of metal, wood or other suitable material and it is preferably provided with a rounded indent or socket 61 which engages the rounded end of the plunger 50 and forms a universal joint in connection therewith, whereby the yielding member is adapted to tilt in any direction.

A stop 70 of any suitable form is provided for holding the yielding member 60 in limited relation to the base 10. In the illustrated embodiment this stop is in the form of flexible bands composed of canvas, leather or other suitable material, which connect the yielding spring supported member 60 with the relatively stationary base 10.

In the use of a single form of this spring device as hereinbefore described, the base 10 may consist of or be placed upon the bottom of a seat or other structure and the yielding member 60 may constitute the top of such a seat or structure or the rest for a cushion therefor. The weight of a person sitting on said yielding member depresses to a certain degree the sliding plunger 50 and partially compresses the sensitive compression spring 40. In case the device be in use as a seat of an automobile or other vehicle, and receives a severe shock as the vehicle passes over a large obstruction or uneven place, the plunger 50 is further depressed and the sensitive spring 40 is thereby further compressed to a point of resistance greater than the normal tension of the stiff expansion spring 20, and then the force of such shock is transferred to the coils of said expansion spring by the depression of the tubular plunger 30. This depression of the tubular plunger causes the coils of the expaansion spring to separate more or less and take up the jar of such severe shock. In this operation the member 60, owing to its universal bearing on the rounded end 51 of the plunger 50, is free to tilt in any direction to conform to any irregular motion of the occupant, while the plunger 50 slides freely in the tubular plunger as a socket and maintains its vertical position. This facility of oscillation contributes to the ease of the seat. The straps 70 or equivalent stops arrest the yielding member 60 in the rebound of the concentric plungers after passage over the obstructions and hold said yielding member in normal position.

The device in its form shown in Figs. 1 to 5 may be made and sold as an article-of manufacture and the purchaser can place a number of them in a seat box, four being usually sufficient for a single seat.

Figs. 6 and 7 show a seat provided with a plurality of these shock absorbing springs. This is a single seat rectangular in form and has four of these springs disposed adjacent to the four corners thereof. In this construction a seat box 100 is provided with a series of recesses 101 at one end, a corresponding series 102 at the opposite end, another series of recesses 103 at the front and recesses 104 at the rear. These recesses are formed in the upper edge of the box.

In this case the base support for the springs consists of a base frame comprising two elongated longitudinal base plates 110 resting at their opposite ends in the recesses 101 and 102 and elongated transverse base plates 115 resting at their opposite ends in the recesses 103 and 104. The longitudinal plates 110 are provided with apertures 111 near their opposite ends and the transverse base plates 115 are provided with apertures 116 near their opposite ends, the apertures of one set of said plates registering with those of the other set thereof.

Tubular coil expansion springs 20 are supported on this base frame, depending through the registering apertures aforesaid and the coil flanges at the upper end of said springs resting on the elongated base plates 110.

In this case the member corresponding to the member 60 of the former embodiment, comprises a top frame composed of longitudinal slats 160 and transverse slats 165 connecting said longitudinal slats. The longitudinal slats 160 are provided near their opposite ends with rounded indents 161 corresponding with the indents 61 of the yielding member 60, and registering with the apertures in the base frame.

Flexible straps 170 connect the longitudinal slats of the base and top frames and flexible straps 175 connect the transverse slats of said base and top frame.

In the form illustrated, a rectangular plate 200 rests on the top frame and is connected with the seat box 100 by flexible webs 210. This plate is provided with rounded indents 201 opposite the rounded ends of the plungers 50. This plate is upholstered with a covering 202 of leather or other suitable seat fabric and an intermediate stuffing 203 of hair or other suitable material. The covering 202 preferably extends downward and is attached at its lower edges to the seat box 100. If desired the top frame composed of the slats 160 and 165 may be omitted and the plate 200 may rest directly on the springs.

This spring will be found useful for car seats as it is durable and compact and a few of these springs will serve the purpose of the multiplicity of spiral springs ordinarily used in car seats.

I claim as my invention:

1. A spring device comprising a tubular coil expansion spring, means for supporting said spring, a tubular plunger supported in said tubular coil spring, a compression spring disposed in said tubular plunger, a plunger slidable in said tubular plunger and resting on said compression spring, a member supported on said last named plunger, and means for holding said member in limited relation to said expansion spring.

2. A spring device comprising a tubular coil expansion spring, means for supporting said spring, a tubular plunger supported in said tubular coil spring, a compression spring disposed in said tubular plunger, a plunger slidable in said tubular plunger, supported on said compression spring and provided with a rounded upper end, a member having a rounded socket engaged by said rounded end, and means for holding said member in limited relation to said expansion spring.

3. A spring device comprising a base plate provided with an aperture, a tubular coil expansion spring depending from said base plate through said aperture, a tubular plunger supported in said tubular coil spring, a compression spring disposed in said tubular plunger, a plunger slidable in said tubular plunger and resting on said compression spring, a member supported on said last named plunger, and means for holding said member in limited relation to said expansion spring.

4. A spring device comprising a tubular coil expansion spring, means for supporting said spring, a tubular plunger supported in said tubular coil spring, a compression spring disposed in said tubular plunger, a plunger slidable in said tubular plunger and resting on said compression spring, a member supported on said last named plunger, and a flexible fabric connecting said supporting means with said member and serving to limit the motion of the latter.

5. A spring device comprising a tubular coil expansion spring, means for supporting said spring, a tubular plunger supported in said tubular coil spring, a compression spring disposed in said tubular plunger, a plunger slidable in said tubular plunger, supported on said compression spring and provided with a rounded upper end, a member having a rounded socket engaged by said rounded end, and a flexible fabric connecting said supporting means with said member and serving to limit the motion of the latter.

6. A spring device comprising a base plate provided with an aperture, a tubular coil expansion spring depending from said base plate through said aperture and provided at its upper end with an enlarged coil engaging said base plate, a tubular plunger supported in said tubular coil spring, a compression spring disposed in said tubular plunger, a plunger slidable in said tubular plunger and resting on said compression spring, a member supported on said last named plunger, and means for holding said member in limited relation to said expansion spring.

7. A spring device comprising a tubular coil expansion spring having a transverse bend at its lower end, means for supporting said spring, a tubular plunger disposed in said expansion spring and supported by the transverse bend thereof, a compression spring disposed in said tubular plunger, a plunger slidable in said tubular plunger and resting on said compression spring, a member supported on said last named plunger, and means for holding said member in limited relation to said expansion spring.

8. A spring device comprising a base plate provided with an aperture, a tubular coil expansion spring depending from said base plate through said aperture and provided at its upper end with an enlarged coil engaging said base plate and at its lower end with a transverse bend, a tubular plunger disposed in said expansion spring and engaging the transverse bend thereof, a compression spring disposed in said tubular plunger, a plunger slidable in said tubular plunger and resting on said compression spring, a member supported on said last named plunger, and means for holding said member in limited relation to said expansion spring.

9. A spring device comprising a tubular coil expansion spring, means for supporting said spring, a tubular plunger supported in said tubular coil spring and provided with an inner stop at its lower end, a compression spring disposed in said plunger and resting on said stop, a plunger slidable in said tubular plunger and resting on said compression spring, a member supported on said last named plunger, and means for holding said member in limited relation to said expansion spring.

10. A spring device comprising a tubular coil expansion spring, means for supporting said spring, a tubular plunger supported in said tubular coil spring and provided with a removable closing device at its lower end, a compression spring disposed in said plunger and resting on said closing device, a plunger slidable in said tubular plunger and resting on said compression spring, a member supported on said last named plunger, and means for holding said member in limited relation to said expansion spring.

11. A seat spring comprising a base frame provided with a plurality of apertures, a series of tubular coil expansion springs depending through said apertures, tubular plungers supported in said tubular expansion springs, compression springs disposed in said tubular plungers, plungers slidable in said tubular plungers and resting on said compression springs, a member supported on said last named plungers, and means for holding said member in limited relation to said base.

12. A spring device comprising a base, a tubular coil expansion spring supported by and depending from said base, a tubular plunger disposed in said tubular coil expansion spring and supported at the lower end thereof, a compression spring disposed in said tubular plunger below said base, a plunger movable in said tubular plunger and supported at its lower end on said compression spring, and a member supported on said last named plunger.

13. A spring device comprising, a supporting member, a tubular coil expansion spring attached at its upper end to said supporting member, a tubular plunger disposed in said tubular coil expansion spring and supported at the lower end thereof, a compression spring disposed in said tubular plunger, a plunger movable in said tubular plunger and supported at its lower end on said compression spring, and a member supported on said last named plunger.

14. In a spring device, the combination of a supporting member, a tubular coil expansion spring supported at its upper end on said supporting member and depending therefrom, a compression spring disposed in said tubular coil expansion spring, a plunger movable in said tubular coil expansion spring, resting at its lower end on said compression spring and projecting at its upper end above the top of said tubular coil expansion spring, and a member supported on said plunger.

15. In a spring device, the combination of a supporting member, a tubular coil expansion spring supported at its upper end on said supporting member and depending therefrom, a compression spring disposed in said tubular coil expansion spring, a plunger movable in said tubular coil expansion spring, resting at its lower end on said compression spring and projecting at its upper end above the top of said tubular coil expansion spring, a tube disposed between said springs, and a member supported on said plunger.

WILLIAM H. KELLY.

Witnesses:
FRANK CHASE SOMES,
GERTRUDE BORNET.